United States Patent
Black

(10) Patent No.: US 9,215,234 B2
(45) Date of Patent: Dec. 15, 2015

(54) SECURITY ACTIONS BASED ON CLIENT IDENTITY DATABASES

(75) Inventor: Chuck A Black, Rocklin, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 18 days.

(21) Appl. No.: 13/356,742

(22) Filed: Jan. 24, 2012

(65) Prior Publication Data

US 2013/0191901 A1 Jul. 25, 2013

(51) Int. Cl.
*G06F 17/30* (2006.01)
*H04L 29/06* (2006.01)

(52) U.S. Cl.
CPC ......... *H04L 63/0876* (2013.01); *H04L 63/1466* (2013.01)

(58) Field of Classification Search
CPC .............................. H04L 63/08; H04L 63/0876
USPC ............................................................ 726/7
See application file for complete search history.

(56) References Cited

U.S. PATENT DOCUMENTS

| | | | |
|---|---|---|---|
| 7,568,107 B1 * | 7/2009 | Rathi | G06F 21/41 713/182 |
| 7,596,614 B2 | 9/2009 | Saunderson et al. | |
| 7,710,933 B1 | 5/2010 | Sundaralingam et al. | |
| 7,903,647 B2 * | 3/2011 | Kanekar et al. | 370/389 |
| 7,974,201 B1 * | 7/2011 | Daruwalla et al. | 370/235 |
| 7,975,048 B2 * | 7/2011 | Saunderson et al. | 709/224 |
| 8,000,698 B2 | 8/2011 | Wolman et al. | |
| 8,045,488 B2 * | 10/2011 | Swan | 370/256 |
| 8,528,071 B1 * | 9/2013 | Kwan | 726/14 |
| 2005/0246767 A1 * | 11/2005 | Fazal et al. | 726/11 |
| 2006/0130126 A1 * | 6/2006 | Touve et al. | 726/5 |
| 2006/0161770 A1 * | 7/2006 | Goto et al. | 713/167 |
| 2006/0187858 A1 * | 8/2006 | Kenichi et al. | 370/254 |
| 2006/0248229 A1 * | 11/2006 | Saunderson et al. | 709/245 |
| 2007/0186106 A1 | 8/2007 | Ting et al. | |
| 2007/0204330 A1 * | 8/2007 | Townsley et al. | 726/4 |
| 2007/0256122 A1 * | 11/2007 | Foo | H04L 63/1433 726/5 |
| 2007/0280207 A1 * | 12/2007 | Shimizu et al. | 370/353 |
| 2008/0002625 A1 * | 1/2008 | Cho et al. | 370/331 |
| 2008/0101240 A1 | 5/2008 | Rohilla et al. | |
| 2009/0100500 A1 * | 4/2009 | Wang et al. | 726/2 |
| 2009/0116404 A1 * | 5/2009 | Mahop et al. | 370/254 |
| 2009/0161597 A1 * | 6/2009 | Madanapalli | 370/315 |
| 2009/0285128 A1 * | 11/2009 | Swan | 370/256 |
| 2009/0285215 A1 * | 11/2009 | Kaippallimalil et al. | 370/392 |
| 2010/0208621 A1 * | 8/2010 | Morper | 370/255 |

(Continued)

FOREIGN PATENT DOCUMENTS

KR 20070081116 8/2007

*Primary Examiner* — Techane Gergiso
(74) *Attorney, Agent, or Firm* — Hewlett Packard Enterprise Patent Department

(57) ABSTRACT

Example embodiments disclosed herein relate to authentication based on Media Access Control (MAC) addresses. A network security device receives one or more client identity databases from one or more edge network devices. The client identity databases include MAC addresses of clients and secondary identification information for each of the clients. The network security device determines that a client device has been connected to one of the edge devices. A security action is performed based on whether the MAC address and respective secondary identification information of one of the clients matches the MAC address and respective secondary identification information of the connected client device.

20 Claims, 3 Drawing Sheets

(56) References Cited

U.S. PATENT DOCUMENTS

2010/0293250 A1* 11/2010 Ankaiah et al. ............... 709/219
2010/0309915 A1* 12/2010 Pirbhai et al. ................. 370/392
2011/0067119 A1* 3/2011 Baum ............................ 726/34
2011/0274111 A1* 11/2011 Narasappa et al. ........... 370/392
2011/0302643 A1* 12/2011 Pichna et al. ..................... 726/7

* cited by examiner

SECURITY ACTIONS BASED ON CLIENT IDENTITY DATABASES

BACKGROUND

Users of computing devices use networks to interconnect their devices. In certain networks, media access control (MAC) addresses are used to allow access to the respective networks. In other networks, other authentication mechanisms, such as mechanisms based on the Institute of Electrical and Electronics Engineers (IEEE) 802.1X standard or based on web-based authentication can be used.

BRIEF DESCRIPTION OF THE DRAWINGS

The following detailed description references the drawings, wherein.

DETAILED DESCRIPTION

Figure 1:
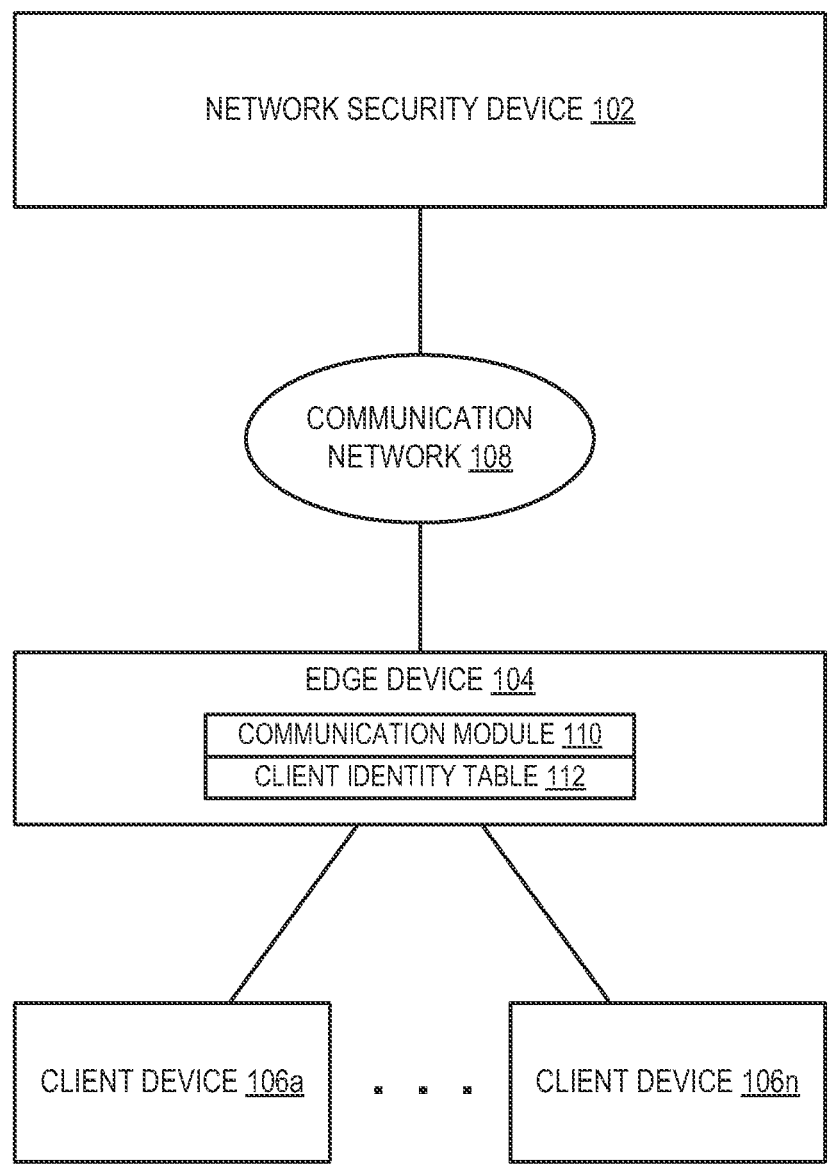
FIG. 1 is a block diagram of a networking system capable of facilitating network access to a client based on a client identity table, according to one example.

Many computing devices are connected via the use of networks. Networks can be used in various settings, for example, in a corporate setting, a college campus setting, a chain of shops setting, etc. In some of these settings, the network provides access to the Internet, private networks, Intranets, combinations thereof, etc. Owners and/or administrators of the networks may not wish for all users to obtain access to some or all of the network features provided. As such, authentication schemes can be used in the provisioning of access to client devices.

Media access control (MAC) based authentication of devices to obtain access to a network is simple and reliable. However, MAC based authentication suffers from the possibility of MAC-address spoofing by malicious users attempting to obtain access to the network. These users may change or 'spoof' their MAC-address to pretend to be a device that has access to the network. As a result of this security issue, many administrators of networks do not deploy MAC-based authentication schemes even though MAC-based authentication can greatly simplify the process of securing the network edge of the network.

Accordingly, various embodiments disclosed herein relate to performing a security action based on a MAC address and secondary identification information of a device. The MAC address and secondary information for connected devices can be collected at a network edge device. In certain embodiments, a network edge device is a device that provides an entry point to a network, for example, an enterprise network, a service provider core network, combinations thereof, etc. Examples of network edge devices include routers, switches, access points, combinations thereof, or the like.

The edge devices that connect to respective client devices perform discovery of the secondary identification information of connected client devices. The secondary identification information can include information such as an Internet Protocol (IP) address, a Hostname, a Username, an Operating System (OS) type, a device type, services provided, combinations thereof, or the like. The secondary identification information can be collected and organized into a data structure such as a table. Further, the data structure can be indexed by the MAC address of the respective client devices. As such, the MAC address can be considered a key for the respective client devices. In one embodiment, the data structure used is a client identity table as detailed further below. The respective edge devices can provide the client identity table or another structure of the MAC addresses and secondary identification information to one or more entities, for example via a request over Simple Network Management Protocol (SNMP), Network Configuration Protocol (NetConf), or another mechanism.

In certain embodiments, the entity receiving the information is a network security device. A network security device is a machine that implements one or more safety measures for the network. The network security device can include functionality to validate the identity of client devices. Further, in certain scenarios, the network security device may implement provisions or policies to prevent and monitor unauthorized access, misuse, etc. of the network. In one example, the network security device can receive the secondary identification information via one or more client identity tables received from one or more edge devices, and perform a security action based on the information. A security action is a step performed based on a determination of the identity of a client. In one example, the security action can be removing the client from the network based on a mismatch in secondary identification information between the client and the client identity table. In another example, the security action can be limiting access of the network to the client. A further example can include generating a message for an administrator noting the improper access. Yet another example can include the security action requesting another form of authorization, such as a web authentication, a username and/or password, etc. before permitting access to the network.

FIG. 1 is a block diagram of a networking system capable of facilitating network access to a client based on a client identity table, according to one example. The system 100 can include a network security device 102 that communicates with an edge device 104 or multiple edge devices and/or client devices 106a-106n via a communication network 108. In certain examples, the network security device 102 and/or the client devices 106a-106n are computing devices, such as servers, client computers, desktop computers, mobile computers, etc. Further, the network security device 102, edge device 104, and/or the client devices 106 can be implemented via a processing element, memory, and/or other components.

The communication network 108 can use wired communications, wireless communications, or combinations thereof. Further, the communication network 108 can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication network 108 can be in the form of a direct network link between devices. Various communications structures and infrastructure can be utilized to implement the communication network(s).

By way of example, the client devices 106, the network security device 102, and/or edge device 104 communicate with each other and other components with access to the communication network 108 via a communication protocol or multiple protocols. A protocol can be a set of rules that defines how nodes of the communication network 108 interact with other nodes. Further, communications between network nodes can be implemented by exchanging discrete packets of data or sending messages. Packets can include header information associated with a protocol (e.g., information on the location of the network node(s) to contact) as well as payload information. In certain examples, the communication network 108 can include one or more edge devices 104. In other examples, network security device 102, the edge device 104, and/or other devices associated with one network can be connected to other devices via another communication network.

The edge device 104 can include a communication module 110 to communicate with the client devices 106, the network security device 102, and/or other devices. The communication module 110 can also be used to collect information about client devices 106. The information gathered by the edge device 104 can be stored in a client identity table 112. Table 1 is an example of a client identity table.

TABLE 1

CLIENT IDENTITY TABLE

| ATTRIBUTES | CLIENT1 | CLIENT2 | CLIENT3 ... |
|---|---|---|---|
| CLIENT MAC | MAC1 | MAC2 | MAC3 ... |
| IP | IPADDRESS1 | IPADDRESS2 | ... |
| Hostname | Hostname1 | Hostname2 | ... |
| Username | — | USERNAME2 | ... |
| OS Type | WINDOWS VISTA | MAC-OS | ... |
| Device Type | PC | IMAC | ... |
| Services | FTP, HTTP | HTTP, DNS | ... |

The client identity table 112 can include an index based on MAC addresses, such as MAC1, MAC2, MAC3, etc. Table 1 shown is for example purposes and as such it is noted that it is contemplated that additional clients can be added to the client identity table, for example, CLIENT3. Moreover, Table 1 is shown as a group of attributes for clients in a first column and populated fields for the clients in the remaining columns. It is contemplated that the table can be presented in other forms, for example as a group of attributes for the clients in a first row and rows populating the fields corresponding to each client. Further, fields for the devices can be populated differently and/or additional secondary identification categories such as IP, Hostname, Username, OS type, Device type, Services, etc. can be used. Moreover, fields, such as the username for MAC1, can be empty. This can occur, for example, when a field entry has not yet been discovered or if the field entry does not apply to the respective client. Moreover, each of the attributes for secondary identification can be associated with different methods of learning as shown in Table 2.

TABLE 2

CLIENT IDENTITY INFORMATION

| ATTRIBUTE | METHOD OF LEARNING |
|---|---|
| MAC Address | Normal Edge device behavior |
| IP Address | DHCP and/or ARP snooping |
| Hostname | DNS snooping |
| Username | Access control and/or RADIUS |
| OS Type | TCP and/or DHCP fingerprinting |
| Device Type | LLDP |
| Services | UDP/TCP port snooping |

The MAC address of the client device 106 can be discovered by the edge device 104 during normal behavior of the edge device 104. An IP address can be discovered using Dynamic Host Configuration Protocol (DHCP) snooping, Address Resolution Protocol (ARP) snooping, or other similar protocol snooping. Snooping can be performed using various protocols and/or various versions of protocols.

Similarly, the hostname of the client device 106 can be determined using Domain Name Service (DNS) snooping. The DNS is a distributed database that includes information on domains and/or hostnames as well as how each relates to IP addresses that are assigned to devices.

Further, a username associated with the client device 106 can be determined using an access control mechanism such as a Remote Authentication Dial In User Service. The RADIUS protocol can be used by enterprise administrators as well as Internet Service Providers to manage access to the Internet, internal networks, wireless networks, e-mail services, etc.

Moreover, the OS type can be determined using OS fingerprinting methods such as Transmission Control Protocol (TCP) fingerprinting and DHCP fingerprinting. In certain embodiments, these fingerprinting examples can be referred to as Transmission Control fingerprinting and Dynamic Host Configuration fingerprinting that can use one or more versions of protocols. Certain parameters for the respective fingerprinting approaches are left to operating systems for implementation. Different operating systems and/or different versions of the same operating system set different default values for these parameters. By collecting and examining this information, the edge device 104 can differentiate between various operating systems to determine an operating system to associate with the client device 106. Examples of OS types include LINUX, UNIX, WINDOWS, MAC OS, ANDROID, and HP WEBOS. Other approaches can be used to determine the OS type, for example, Hypertext Transfer Protocol snooping.

Additionally, the type of client device 106 can be determined based on other types of available information, for example, Linked Layer Discovery Protocol (LLDP) information. In certain embodiments, Linked Layer Discovery Information is information collected about devices via advertising. Network devices can advertise their identity, capabilities, neighbors, etc. and the edge device 104 and/or another device can collect and use this information to determine the type of device. Examples of device types include personal computer (PC), IMAC, mobile device, gaming device, etc.

Further, characteristics of usage of the client device 106 can be determined and profiled by the edge device 104. For example, usage of services can be determined using User Datagram Protocol (UDP) and/or TCP port snooping. With UDP, computer applications send out messages to other hosts on an IP network. UDP and/or TCP may use particular ports for communications of particular types of information. As such, the edge device 104 can profile a client device 106 based on how ports are used.

Moreover, in certain examples, one or more of the attributes can be learned by determining user agent information from a web request of the client device 106. The client device 106 can send a web request via an edge device 104. When the web request is sent using HTTP, a User-Agent header can be sent. The User-Agent header may include information such as operating system, software vendor of an application using the agent, software revision, a type of application using the agent, etc. The header can be used by the client and services to provide suitable content for the particular client device 106.

When a client device 106 joins a network serviced by the network security device 102 via an edge device 104, a client identity table 112 for the client device 106 can be retrieved, generated, updated, or a combination thereof. Even though not shown in FIG. 1, multiple edge devices can be used to service a network and can be serviced by the network security device 102.

Information from client identity tables 112 can be transmitted to the network security device 102. With this information, the network security device 102 can authenticate client devices 106 based on a MAC address and secondary identification information learned via the edge device 104. In certain scenarios, each of the available secondary identification information would need to be matched for the authentication to proceed. In other scenarios, a set of the secondary identification information can be matched for the authentication to succeed. Further, other authentication mechanisms may be used for first time devices and/or devices with MAC addresses not yet registered at the network security device 102.

In one example, the client device 106 connects to the network via the edge device 104. The edge device 104 does not recognize the client device 106 using MAC based authentication and/or MAC based authentication using secondary identification information. The network security device 102 may then trigger a security action for the client device 106. The security action can include, for example, requesting the client device to authenticate via another security mechanism, for example, a username and/or password, a security token, or the like. This authentication can be used to add the MAC address associated with the client device 106 to a client identity table 112 on the edge device 104. The edge device 104 can continue to populate the client identity table 112 for the client device 106. This client identity table 112 can be sent to the network security device 102.

The network security device 102 can receive one or more client identity tables from one or more edge devices via a receiver. As further detailed in the description of FIGS. 2A and 2B, the network security device 102 can compile the client identity tables into a client information memory. When the same client is connected to another edge device, the client information memory can be updated with additional information gleamed at the other edge device. Further, a client discovery module can be used to discover when a client has been connected to one of the edge devices. In certain examples, the network security device 102 can periodically poll edge devices or receive information that a new client has been connected by the edge device. A client authentication module can then be used to perform a security function such as facilitating network access to the connected client. In one example, if the MAC address of the client and its secondary identification information currently determined at the edge device match a MAC address and at least a set of secondary identification information stored in the client information memory, the network security device 102 can decide to facilitate network access. Other security functions can also be performed based on a comparison of the connected client's MAC address and secondary identification information and previously determined information about a client with the same MAC address. In one example, the client connected can be the client device 106 connected previously.

Figure 2:
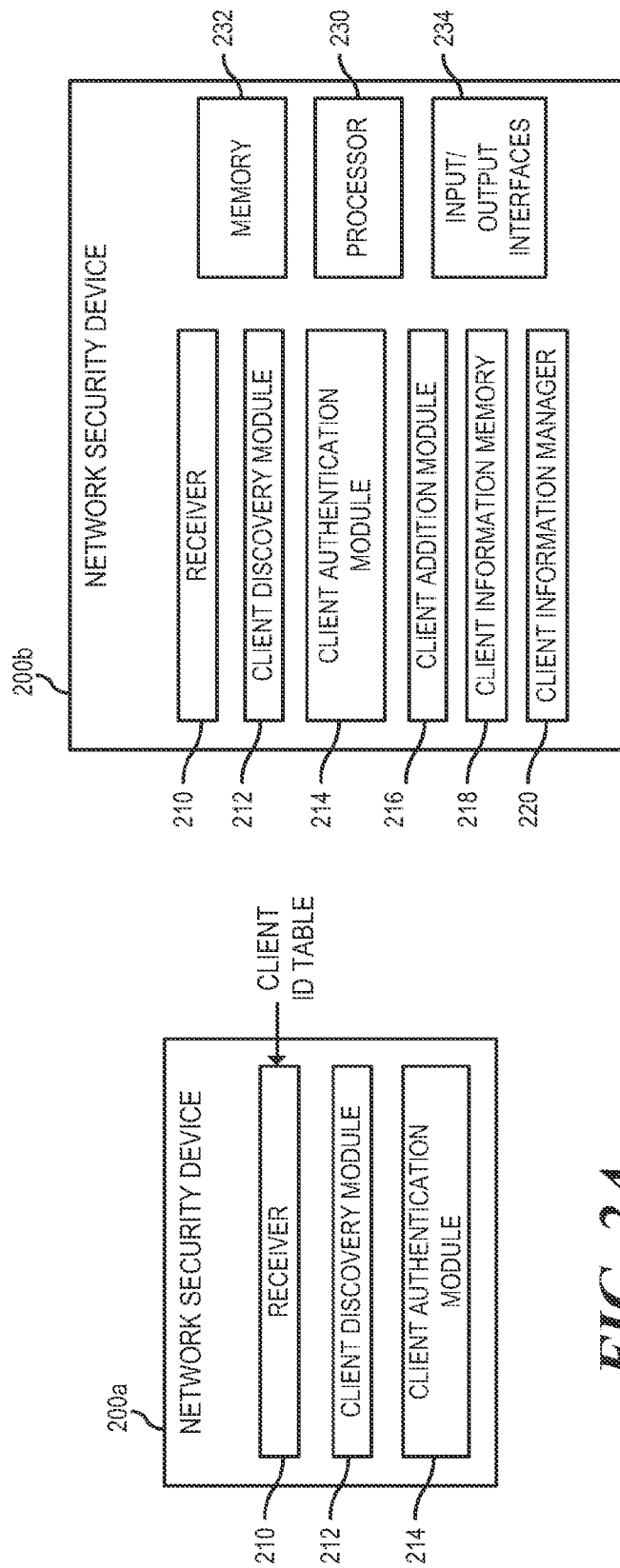
FIGS. 2A and 2B are block diagrams of network security devices capable of facilitating access to a network based on a client identity table, according to various examples.

FIGS. 2A and 2B are block diagrams of network security devices capable of facilitating access to a network based on a client identity table, according to various examples. Network security devices 200a, 200b include components that can be utilized to perform a security action based on a client identity table. The respective network security devices 200a, 200b may be a notebook computer, a desktop computer, a server, a workstation, or any other computing device that can perform client authentication using client identity tables. In one embodiment, the network security device 200a can include a receiver 210, a client discovery module 212, and a client authentication module 214. In other embodiments, the network security device 200b can further include a client addition module 216, a client information memory 218, and a client information manager 220.

A processor 230, such as a central processing unit (CPU) or a microprocessor suitable for retrieval and execution of instructions and/or electronic circuits can be configured to perform the functionality of any of the modules 212-216, 220 described herein. In certain scenarios, instructions and/or other information, such as client information, can be included in memory 232 or other memory. Input/output interfaces 234 may additionally be provided by the network security device 200b. For example, input devices, such as a keyboard, a sensor, a touch interface, a mouse, a microphone, etc. can be utilized to receive input from an environment surrounding the network security device 200b. Further, an output device, such as a display, can be utilized to present information to users. Examples of output devices include speakers, display devices, amplifiers, etc. Moreover, in certain embodiments, some components can be utilized to implement functionality of other components described herein.

Processor 230 may be at least one central processing unit (CPU), at least one semiconductor-based microprocessor, at least one graphics processing unit (GPU), other hardware devices suitable for retrieval and execution of instructions stored in a machine-readable storage medium, or combinations thereof. For example, the processor 230 may include multiple cores on a chip, include multiple cores across multiple chips, multiple cores across multiple devices, or combinations thereof. Processor 230 may fetch, decode, and execute instructions to implement features such as the methods of FIGS. 3 and 4. As an alternative or in addition to retrieving and executing instructions, processor 230 may include at least one integrated circuit (IC), other control logic, other electronic circuits, or combinations thereof that include a number of electronic components for performing the functionality.

Each of the modules 212-216, 220 may include, for example, hardware devices including electronic circuitry for implementing the functionality described herein. In addition or as an alternative, each module 212-216, 220 may be implemented as a series of instructions encoded on a machine-readable storage medium of network security device 200 and executable by processor 230. It should be noted that, in some embodiments, some modules are implemented as hardware devices, while other modules are implemented as executable instructions.

A machine-readable storage medium may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium may be encoded with a series of executable instructions for performing processes of modules 212-216, 220.

The network security device 200 can be part of a networking system where the network security device 200 can perform security actions when clients are connected to edge devices of the networking system. In one example, the network security device 200 can authenticate access for client devices connected to the network. As noted above, the authentication can be based on a MAC address of the respective client devices and respective secondary identification information.

The receiver 210 can receive one or more client identity tables from one or more edge network devices connected to the network security device 200. In certain examples, a transceiver or other communication module can be used in place of the receiver 210. The client identity tables can include MAC addresses for one or more clients and secondary identification information for each of the clients. As noted above, the secondary identification information can include an associated operating system type, an associated host name, an associated device type, a set of services associated with the respective clients, an internet protocol address, an associated client traffic pattern, combinations thereof, or the like. As detailed above, one or more of the secondary identification information can be determined at respective edge devices connected to clients based on DHCP fingerprinting, TCP fingerprinting, HTTP snooping, DNS snooping, ARP snooping, be based on LLDP information, etc.

The received client identity tables can be formatted, generated, and/or updated at respective edge devices connected to clients. As such, some of the client identity tables received can include information about a MAC address previously on a client identity table. The client identity tables can be stored in a client information memory 218. The client information memory 218 can be used to store, as structured information, the information about the clients received from the client identity tables. In certain examples, the client information memory 218 can be stored as a client identity table that is a compilation of other client identity tables. In certain scenarios, the receiver 210 can receive updated client identity tables from the edge devices and the client information manager 220 updates the structured information with updated information about the clients.

When a new client is connected to the network via an edge device, the client discovery module 212 can discover that the client has been connected to the network and that a security function should be performed. In certain examples, the network security device 200 can use an input/output interface 234 to communicate with the edge devices. The client discovery module 212 can be used to request information about newly connected clients and/or receive information automatically form the edge devices when a new client device is connected.

The client authentication module 214 can then determine whether the connected client is known and perform a security function based on the determination. This determination can be made based on information stored in the client information memory 218 based on the client identity tables received. As noted, the client identity tables can be based on information gathered during a previous access of the connected client to the network. The information gathered can be based on snooping performed at the respective network edge devices.

The client authentication module 214 can compare the information (e.g., MAC addresses and secondary identification information) about clients in the client information memory 218 with information about the connected client. As such, the connected edge device can send and the network security device 200 can receive a client identity table or another data structure including the MAC address and secondary identification information associated with the connected client.

In certain scenarios, if the connected client matches at least a set of the secondary identification information of the corresponding MAC address in the client information memory 218, a positive security function can be performed. For example, the client authentication module 214 can facilitate access to the network for the connected client device.

If there is not a match, another security function can be performed. For example, the client authentication module 214 may ask for another form of authentication (e.g., authentication based on username and password, authentication based on a token, etc.), the client authentication module 214 may deny network access to the connected client, provide a restricted level of access to the connected client, generate an alert or warning, or the like. In one example, a restricted level of access may also be provided to the connected client if its secondary identification information partially matches the secondary identification information stored in the client information memory 218. The alert or warning may be sent to an administrator of the network as a message, pop up in a display, be added to a log, or the like.

In certain scenarios, the client information manager 220 can update the client information memory 218 for a successfully authenticated client device. If there is no MAC address in the client information memory 218, but the connected device was authenticated, the client addition module 216 can add information about the connected device into the client information memory 218.

Figure 3:
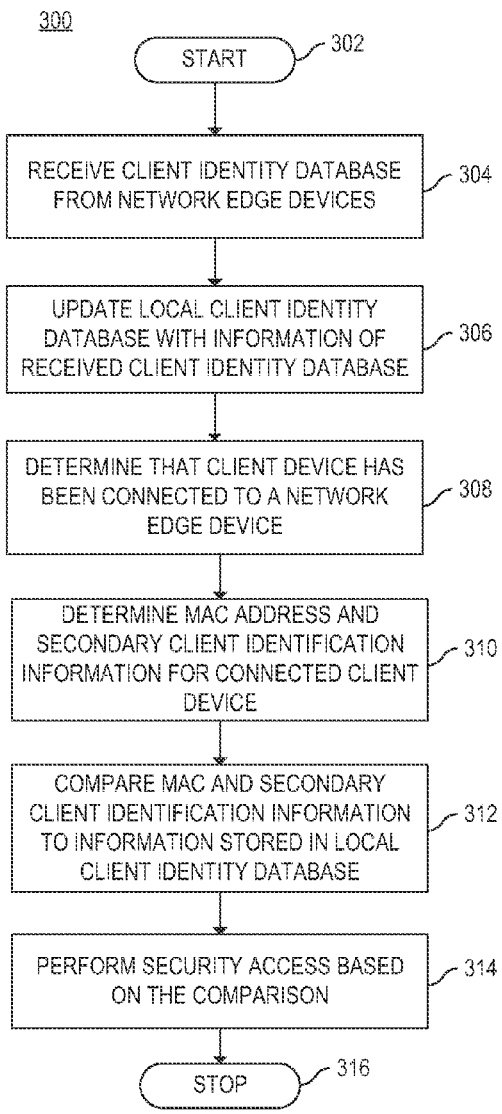
FIG. 3 is a flowchart of a method for performing a security action based on a client identity database, according to one example.

FIG. 3 is a flowchart of a method for performing a security action based on a client identity database, according to one example. Although execution of method 300 is described below with reference to a network security device, other suitable components for execution of method 300 can be utilized. Additionally, the components for executing the method 300 may be spread among multiple devices. Method 300 may be implemented in the form of executable instructions stored on a machine-readable storage medium and/or in the form of electronic circuitry.

Method 300 may start at 302, where a networking system can be implemented. One or more edge devices can be connected to one or more clients. The edge devices can collect information about the clients including a MAC address and secondary identification information using various techniques discussed above. As noted above, the secondary identification information can include an associated operating system type, an associated host name, an associated device type, an associated client service, an associated client traffic pattern determined at the edge device, combinations thereof, etc. The edge devices can format the information into a client identity database. In certain embodiments, a client identity database is a populated data structure that includes the MAC address and secondary identification information about connected clients. The MAC address can be used as an index for the client identity database. A client identity table is an example of a client identity database. The edge device transmits the client identity database to a network security device.

At 304, the network security device receives the client identity database from one of one or more edge devices associated with the network security device's network. The network security device can update a second client identity database with the information stored in the first client identity database at 306. The second client identity database can be stored in a client information memory. The client identity database can be a local database for the network security device or be stored at another location accessible by the network security device. During the update, additional or changed secondary identification information can be added/changed in the second client identity database.

At 308, the network security device determines that a client device has been connected to one of the network edge devices. This can occur at a later time, after information about one or more client devices has been collected. The determination can be made by polling the edge devices for information about client devices that are connected, by automatically receiving information about new client devices connected to the edge devices, or other similar mechanisms.

At 310, the network security device determines a MAC address and client secondary identification information for the connected client device. This information can be sent from the connected network edge device and received at the network security device. In one scenario, the information can be received as a client identity table including current clients of the connected network edge device. In another scenario, the information can be received as a message or attachment from the connected network edge device.

Then, at 312, the MAC address and client secondary identification information about the connected client device can be compared to the second client identity database. The comparison can provide various results. In one example, the client's secondary identification information can be an exact match with the second client identity database for the MAC address. In another example, a set of the client's secondary identification information can match, while another portion of the client's secondary identification information does not match. Various issues can arise based on the type of discrepancy. For example, an update in an operating system version number can be less of a security threat than a determination that the operating system has changed. In yet another example, each of the secondary identification information can be different.

At 314, a security action is performed based on the comparison. Security actions can include, for example, facilitating access to the network for the connected client device if a sufficient number of the secondary identification information matches the corresponding entry of the client identity database. Security actions can also include denying access to the connected client device, providing a restricted level of access to the connected client device, generating an alert or warning to an administrator for the connected client device, requesting another form of authentication, etc. Then, at 316, the method 300 stops. The network security device can continue to perform other processes.

Figure 4:
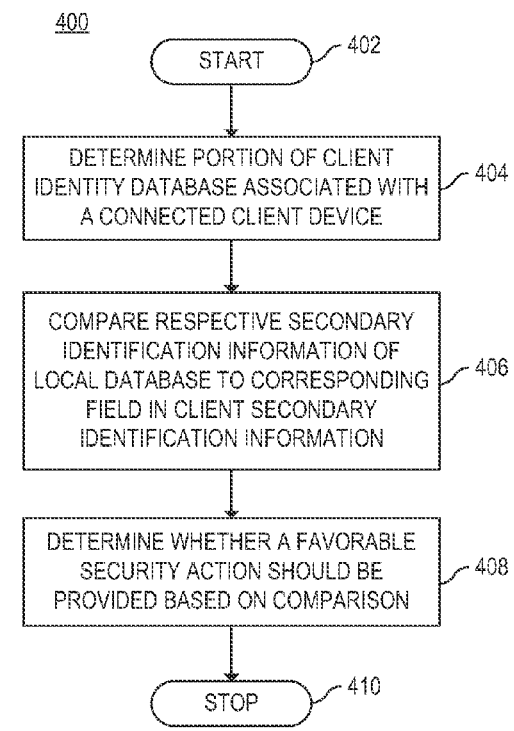
FIG. 4 is a flowchart of a method for determining a favorable security action based on a comparison of secondary identification information, according to one example.

FIG. 4 is a flowchart of a method for determining a favorable security action based on a comparison of secondary identification information, according to one example. Although execution of method 400 is described below with reference to a network security device, other suitable components for execution of method 400 can be utilized. Additionally, the components for executing the method 400 may be spread among multiple devices. Method 400 may be implemented in the form of executable instructions stored on a machine-readable storage medium and/or in the form of electronic circuitry.

The method 400 can start at 402, where the network security device may be in a state where the network security device is authenticating a connected client device. As noted above, the authentication can be based on a MAC address and secondary identification information stored in a client identity database accessible by the network security device. The method 400 can proceed to 404, where the network security device determines a portion of a client identity database associated with a connected client device. The portion can be based on the MAC address of the currently connected client device, for example, by using the MAC address as an index.

At 406, the network security device compares at least one of the secondary identification information of the portion of the client identity database to a corresponding field in the client secondary identification information. The comparison can be used to determine whether a favorable security action should be provided (at 408). In certain embodiments, a favorable security action is an action that facilitates access to the network for the client device. Facilitating access can include, for example, facilitating complete access to the network, limited access to the network, or the like. In certain examples, a favorable action is provided if the secondary information for the client device matches and/or partially matches the secondary information stored in the database for the associated MAC address. Then, at 410 the method 400 stops. The network security device can continue to perform other operations.

What is claimed is:

1. A network security device comprising:
   a receiver to receive one or more client identity tables from one or more edge network devices, wherein one of the client identity tables includes Media Access Control addresses for a plurality of clients and secondary identification information for each of the clients; and
   processing hardware implementing:
   a client information memory and a client addition module to update the received one or more client identity tables by adding the secondary identification information for one of the clients to produce respective updated secondary identification information;
   a client discovery module to discover a connected client device connected to one of the edge network devices; and
   a client authentication module to authenticate an identity of the connected client device based on whether the respective Media Access Control address and the respective updated secondary identification information for one of the clients matches a second Media Access Control address and a second secondary identification information of the connected client device and to perform a security action according to a result of authentication.

2. The network security device of claim 1, wherein for each of the clients in the client identity tables, the secondary identification information for the client includes at least one of: an associated operating system type, an associated host name, an associated device type, a set of services associated with the client, and an associated client traffic pattern.

3. The network security device of claim 1, further comprising:
   client information memory to store, as structured information, information about the respective clients received from the client identity tables.

4. The network security device of claim 3, further comprising:
   a client information manager,
   wherein the receiver receives an updated client identity table from one of the network edge devices connected to the connected client device,
   wherein the updated client identity table includes additional information about the connected client device, and
   wherein the client information manager updates the structured information with the updated information about the connected client device.

5. The network security device of claim 1, wherein the one client identity table is based on information gathered during a previous access of the connected client to a network associated with the network security device.

6. The network security device of claim 1, wherein the secondary identification information for the connected client is based, at least in part, on snooping performed at one of the network edge devices previously connected to by the connected client.

7. The network security device of claim 1, wherein the secondary identification information includes an associated operating system type based on at least one of Dynamic Host Configuration fingerprinting and Transmission Control fingerprinting, and Hypertext Transfer snooping.

8. The network security device of claim 1, wherein the secondary identification information includes an associated host name based on at least one of Domain Name System snooping and Address Resolution snooping.

9. The network security device of claim 1, wherein the secondary identification information includes an associated device type based on Link Layer Discovery information.

10. The network security device of claim 1, wherein the processing hardware comprises a processor that executes instructions to perform functions of at least one of the client discovery module and the client authentication module.

11. The network security device of claim 1, wherein the security action for the connected client device comprises limiting access of the connected client device to a network in response to the second secondary identification information of the connected client device failing to match the updated secondary identification information for one of the clients having a Media Access Control address that matches the second Media Access Control address.

12. The network security device of claim 11, wherein limiting access of the connected client device to the network comprises removing the connected client from the network.

13. The network security device of claim 1, wherein the security action for the connected client device comprises one or more actions selected from a group consisting of:
limiting access of the connected client device to a network;
removing the connected client from the network;
generating a message for an administrator noting improper access; and
requesting further authorization for the connected client to be connected to the network.

14. A method comprising:
receiving, from one of a plurality of network edge devices, a first client identity database, the first client identity database storing information including Media Access Control addresses for a plurality of clients and secondary identification information for each of the plurality of clients;
updating a second client identity database by adding the information stored in the first client identity database to produce an updated second client identity database;
determining that a client device has been connected to one of the network edge devices;
determining a first Media Access Control address and a client secondary identification information for the connected client device;
authenticating an identity of the client device by comparing the first Media Access Control address and the client secondary identification information to the updated second client identity database; and
performing a security action based on the comparison.

15. The method of claim 14, wherein the client secondary identification information includes at least one of: an associated operating system type, an associated host name, an associated device type, an associated client service, and an associated client traffic pattern determined at the one network edge device.

16. The method of claim 15, wherein the comparison further comprises:
determining a portion of the second client identity database associated with the client device; and
comparing at least one of the respective secondary identification information in the portion to a corresponding field in the updated client secondary identification information, wherein a favorable security action is provided if the respective secondary identification information matches the corresponding field of the updated client secondary identification information.

17. A networking system comprising:
one or more edge devices each including a communication module to communicate with one or more client devices and a client identity table including Media Access Control addresses and corresponding secondary identification information for the respective client devices; and
a network security device including:
a receiver to receive one or more of the client identity tables from the edge devices;
a client information memory and a client addition module to update the one or more client identity tables by adding the corresponding secondary identification information to produce respective updated secondary identification information;
a client discovery module to discover that a connected client has been connected to one of the edge devices; and
a client authentication module to facilitate network access to the connected client if the respective Media Access Control address and the respective updated secondary identification information for one of the client devices correspond to the connected client.

18. The networking system of claim 17, wherein the respective client identity tables are based, at least in part, on user agent information determined from a web request of the respective client device.

19. The networking system of claim 17, wherein at least a portion of the secondary identification information for the respective connected clients is based, at least in part, on snooping performed at one of the network edge devices previously connected to by the connected client.

20. The network security system of claim 17, wherein for each of the client devices, the secondary identification information in the second client identity database includes at least one of: an operating system type, a host name, a device type, a set of services, and a traffic pattern for the client device.

* * * * *